United States Patent
Sic et al.

(10) Patent No.: US 12,511,380 B2
(45) Date of Patent: Dec. 30, 2025

(54) METHOD AND SYSTEM FOR INTRUSION DETECTION FOR AN IN-VEHICLE INFOTAINMENT SYSTEM

(71) Applicant: BlackBerry Limited, Waterloo (CA)

(72) Inventors: Petar Sic, Mississauga (CA); Irene Melgarejo Lermas, Waterloo (CA); Matthew Bells, Waterloo (CA); Steven John Henkel, Waterloo (CA); Xiaobing Shi, Etobicoke (CA)

(73) Assignee: BlackBerry Limited, Waterloo (CA)

( * ) Notice: Subject to any disclaimer, the term of this patent is extended or adjusted under 35 U.S.C. 154(b) by 207 days.

(21) Appl. No.: 18/120,095

(22) Filed: Mar. 10, 2023

(65) Prior Publication Data

US 2024/0303322 A1   Sep. 12, 2024

(51) Int. Cl.
*G06F 21/55* (2013.01)

(52) U.S. Cl.
CPC .................. *G06F 21/554* (2013.01)

(58) Field of Classification Search
CPC ...................................... G06F 21/554
See application file for complete search history.

(56) References Cited

U.S. PATENT DOCUMENTS

| | | | |
|---|---|---|---|
| 10,990,439 B1 * | 4/2021 | Spivak | G06F 9/4843 |
| 2014/0058615 A1 | 2/2014 | Hatch et al. | |
| 2017/0160110 A1 | 6/2017 | Basu et al. | |
| 2018/0046802 A1 * | 2/2018 | Pyles | H04W 12/128 |
| 2018/0060155 A1 | 3/2018 | Tran Van | |
| 2018/0267731 A1 | 9/2018 | Gortsas | |
| 2019/0039633 A1 | 2/2019 | Li | |
| 2019/0246344 A1 | 8/2019 | Prasad et al. | |
| 2020/0186965 A1 | 6/2020 | Viswanathan | |
| 2020/0334355 A1 * | 10/2020 | Klein | G06F 21/62 |
| 2021/0019640 A1 | 1/2021 | Kim et al. | |
| 2021/0081501 A1 | 3/2021 | Roychowdhury et al. | |
| 2021/0089661 A1 | 3/2021 | Rieger et al. | |

(Continued)

FOREIGN PATENT DOCUMENTS

| | | |
|---|---|---|
| WO | 2013077861 A1 | 5/2013 |
| WO | 2021059302 A2 | 4/2021 |

OTHER PUBLICATIONS

S. Aust, "Vehicle API and Service Catalog for Next Generation Mobility," 2022 25th International Symposium on Wireless Personal Multimedia Communications (WPMC), Herning, Denmark, 2022, pp. 418-423, doi: 10.1109/WPMC55625.2022.10014905. (Year: 2022).*

(Continued)

*Primary Examiner* — Tod R Swann
*Assistant Examiner* — Daniel Elahian
(74) *Attorney, Agent, or Firm* — Moffat & Co

(57) ABSTRACT

A method at a computing device, the method including placing a trace on a plurality of behaviors within a kernel on the computing device; generating data from the trace; assembling the data into an event; and formatting the event into a security sensor output. Further, a computing device having a processor and communications subsystem, wherein the computing device is configured to place a trace on a plurality of behaviors within a kernel on the computing device; generate data from the trace; assemble the data into an event; and format the event into a security sensor output.

20 Claims, 9 Drawing Sheets

(56) References Cited

U.S. PATENT DOCUMENTS

| | | |
|---|---|---|
| 2021/0103260 A1 | 4/2021 | Khurana et al. |
| 2021/0409923 A1* | 12/2021 | Kumar ................ H04L 12/4633 |
| 2022/0161758 A1* | 5/2022 | Moeller ................ G06F 3/167 |
| 2022/0321655 A1* | 10/2022 | Mendez Rodriguez ................... H04L 67/12 |
| 2023/0090918 A1* | 3/2023 | Ludwig ............. H04N 21/4263 725/75 |
| 2023/0205181 A1* | 6/2023 | Kishikawa ............. G05D 1/227 701/2 |
| 2023/0325292 A1 | 10/2023 | Ardel et al. |
| 2024/0160733 A1* | 5/2024 | Papillon ................ G06F 21/554 |

OTHER PUBLICATIONS

U.S. Appl. No. 18/083,102, titled "Method and System for Incremental Centroid Clustering", filed on Dec. 16, 2022.

United States Patent and Trademark Office (USPTO): Office Action for U.S. Appl. No. 18/120,177, date: Jan. 16, 2025, 153 pages.

\* cited by examiner

METHOD AND SYSTEM FOR INTRUSION DETECTION FOR AN IN-VEHICLE INFOTAINMENT SYSTEM

FIELD OF THE DISCLOSURE

The present disclosure relates to vehicle computing systems, and in particular relates to the safety of vehicle computing systems.

BACKGROUND

Modern vehicles have differing processors, control units, sensors and other computing nodes. Such sensors may be distributed within the various computing nodes on the vehicle, where each computing node may have access to zero, one or more sensor drivers. Such sensor nodes may further have different manufacturers and operate using different operating systems. Different vehicle manufacturers may use different hardware and software configurations.

This computerization of vehicles leads to the possibility of cyber attacks on these vehicles. Further, the possibility of cyber attacks on modern vehicles will grow as the attack surface expands due to increased connectivity and software. In-Vehicle Infotainment systems (IVI) are ranked within the top five targets for attackers.

Potential impacts of such cyber attacks on vehicle systems are varied, but may include the jeopardization of the safety of occupants and road users. Further, successful attacks may cause brand damage to the Original Equipment Manufacturer (OEM) and can impact the business of fleet operators.

BRIEF DESCRIPTION OF THE DRAWINGS

The present disclosure will be better understood with reference to the drawings, in which.

DETAILED DESCRIPTION OF THE DRAWINGS

Figure 1:
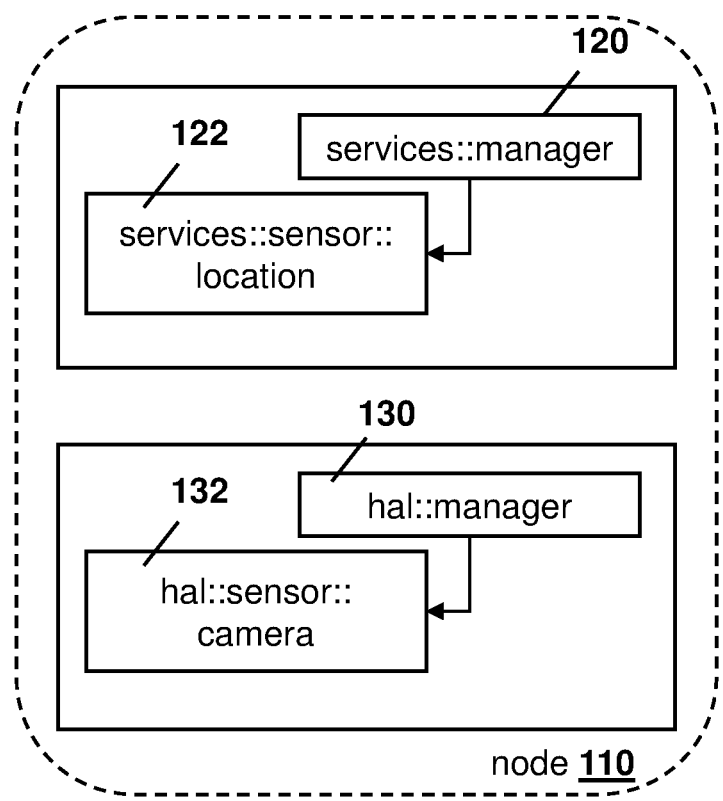
FIG. 1 is a block diagram showing an example computing node within a computer system.

The present disclosure provides a method at a computing device comprising: placing a trace on a plurality of behaviors within a kernel on the computing device; generating data from the trace; assembling the data into an event; and formatting the event into a security sensor output.

The present disclosure further provides a computing device comprising: a processor; and a communications subsystem, wherein the computing device is configured to: place a trace on a plurality of behaviors within a kernel on the computing device; generate data from the trace; assemble the data into an event; and format the event into a security sensor output.

The present disclosure further provides a computer readable medium for storing instruction code, which, when executed by a processor of a computing device cause the computing device to: place a trace on a plurality of behaviors within a kernel on the computing device; generate data from the trace; assemble the data into an event; and format the event into a security sensor output.

The present disclosure relates to the detection and possible prevention of cyber attacks on a computing system. In one embodiment, such computing system belongs on a vehicle. Vehicle computing systems are particularly difficult to protect against cyber attacks since a single vehicle can have a plurality of computing devices on the vehicle, each having different operating systems, communicating with different sensors and Electronic Control Units (ECUs), and performing different functionality. Further, the processing capabilities on a vehicle computing system may in some cases be limited.

However, the present disclosure is not limited to vehicle computing systems, and vehicle computing systems are provided merely for illustration.

Prevention of cyber attacks is generally preferable over detection and response after an attack has already occurred. However, history shows that despite the best efforts of organizations, attackers unfortunately find ways to thwart protective defences and measures.

If an intruder does gain access to the vehicle systems, their presence can often be detected through the behaviors that malicious programs exhibit, which are either characteristic of attacker behaviors or are anomalous with respect to normal system operation. Example of characteristics of attacker behaviors may include those found in the Mitre Att&ck® Tactics, Techniques and Procedures (TTPs).

Therefore, in accordance with the embodiments of the present disclosure, an intrusion detection system for an IVI is provided. In accordance with some embodiments of the present disclosure, the intrusion detection system may be considered a synthetic sensor which generates intrusion insights for processing. Therefore, the embodiments herein provide for an environment having synthetic sensors on vehicles. However, the systems of the present disclosure could be used without the synthetic sensor model described herein.

In a modern vehicle, information from one or more physical sensors may be processed to create an "Insight" that may be valuable in a system. Such one or more physical sensors and the processing associated therewith may be referred to logically as a micro-service or a Synthetic Sensor (SS). The terms micro-service and Synthetic Sensor are used interchangeably herein.

Synthetic Sensors may exist in other types of applications, including but not limited to medical applications, manufacturing applications, Internet of Things applications, among others, and the present disclosure is not limited to vehicle applications. Vehicle applications are provided for illustration below.

Insight is the term used herein to describe any computer created interpretation of basic sensor data. Insights can be as straight forward as data aggregation or correlation or as complex as artificial intelligence and machine learning. For example, a temperature sensor providing high and low watermarks for notification may be considered an "insight". For location services, geofencing is an insight. For cameras, occupant recognition may be an insight. The use of a combination of sensors such as temperature sensors and cameras, may be used with an artificial intelligence model to determine whether a car seat is occupied in a hot vehicle, which may be an insight. Many other examples of insights are possible.

In one embodiment, the vehicle applications may be implemented in a system providing consistent access to vehicle data and intelligent insights in a way that is familiar and accessible to developer communities. Such environment may allow cloud developers to extend their reach to the edge within the vehicle through the development of Synthetic Sensors which derive intelligent insights on vehicle data using common cloud development technologies and paradigms. Such environment may provide consistent access to vehicle data such that Synthetic Sensors can be written and deployed to a broad vehicle base without bespoke customization.

Specifically, using abstraction allows for similar data to be provided to a Synthetic Sensor, while the hardware and software on each vehicle may differ from that of other vehicles. Some vehicles may be configured with certain sensors, hardware, Electronic Control Units (ECUs), or operating systems (OSs) that may not be present in other vehicles.

In the present disclosure, the intrusion detection system may be considered a synthetic sensor and may obtain information from the operating system kernel of at least one processor within the vehicle system. For example, in one embodiment the kernel information may be obtained utilizing an extended Berkeley Packet Filter (eBPF), as described below.

For example, in some of the embodiments described herein, an Android based IVI Linux kernel has been instrumented using eBPF technology. However, similar technology could be used with different operating systems.

eBPF is a kernel technology that allows programs to run without needing to add additional modules or modify the kernel source code. Bytecode can be run that makes use of kernel resources. It can be used for debugging, tracing, firewall, networking, among other options.

In the present embodiments, the eBPF instrumentation generates signals that are forwarded for further processing to the intrusion detection system. The system may monitor operating system level data in real time on the infotainment system host to detect malicious behavior. When malicious behavior is detected, it may be reported to a Security Operations Center.

The intrusion detection system may use various types of detection. In one embodiment, a rules based approach may be used, where such rules based approach looks for a particular attack signature and flags attacks with such signature. In one embodiment, a machine learning inference model may be used for anomaly detection. In some cases, the rules based approach and the machine learning model based approach may be used concurrently.

Example Vehicle System

The present disclosure will be described with regard to an automotive system with nodes. However, this is merely provided for illustration purposes and the methods and systems described herein could equally be used with any other systems.

For example, reference is now made to FIG. 1 which shows a node 110. A node, as used herein, may be one or a group of electronic control units, central processing units, or kernel controls, among other options, and can be considered as a single computing unit.

In the example of FIG. 1, node 110 includes a services manager 120 which may interact with drivers for sensors that the node is connected to. For example, the node 110 may have access to a location sensor such as a Global Positioning System (GPS) chipset, as shown at block 122.

In order to allow node 110 to interact with modules on other nodes, and to provide functionality with a computing system, a Hardware Abstraction Layer (HAL) may be provided on node 110, which comprises a HAL service 130. Each HAL service 130 is responsible for the integration of a sensor and may provide various functions, including: integration to the underlying sensor; normalization of the sensor data; and/or, if required, providing a barrier between the safety certified and non-certified software. Other functions for the HAL service are also possible.

In the example of FIG. 1, the HAL is provided for camera information, as shown with block 132.

While the example of FIG. 1 shows a node 110 with a single service and a single HAL, this is merely provided for illustration purposes. A node 110 could have a single service without a HAL, a single HAL without a service, a plurality of services with no HAL, a plurality of HALs with no service, and/or a combination of services and HALs.

One example of a system that could use node 110 would be an intrusion detection system, where the data being provided to the HAL comes from kernel level data.

In this regard, the Hardware Abstraction Layer can be used to provide hardware and operating system independent sensor interfaces/abstractions. The use of the hardware abstraction in the various computing nodes creates a platform that is extensible, can provide barriers between modules to, for example, enforce safety certified systems being separate from other systems, among other options.

Applications do not interact directly with sensor hardware to access sensor/kernel data, instead they leverage the Hardware Abstraction Layer. This separation provides a clear distinction between the responsibilities of the HAL (sensor/kernel data integration and normalizing data) and other abstractions such as a Vehicle Abstraction Layer (VAL), used for managing access to vehicle data and providing value-added insights.

Specifically, insights may leverage data from multiple HALs in order to provide vehicle abstraction and value-added insights. Vehicle insight services in the VAL may control access to a normalized form of vehicle data and provide value-added inferences. Examples of insight services may include a Location Service, which may provide coordinate location data in a consistent format as well as insights such as geo-fencing; a Seat Service, which may provide a myriad of seat information such as belt status, weight, position, and child lock status; a Camera Service which may provide the video stream for in-cabin camera and possibly functions such as conversions and/or clipping; a Battery Service which may provide insights and access to battery such as charge state/consumption/projected hours remaining/projected range; a Door Service which may provide an abstraction for vehicle doors and door status; and Intrusion Detection Service which may provide insights into anomalous behavior, among others.

Insight Services may leverage sensor data from multiple HALs in order to provide vehicle abstraction and value-add insights. Higher level insights on data enable application developers to create future automotive experiences. Insight is the term used to describe any value-added interpretation of basic sensor data. Insights can be as straight forward as data aggregation or correlation or as complex as artificial intelligence and machine learning.

Nodes with services and HAL managers as described in FIG. 1 are therefore needed for such application development environment. Node 110 will, in many systems, need to communicate with other nodes, such as other ECUs, CPUs, or computing systems, where such ECUs, CPUs, or computing systems may use a different operating system from that of node 110.

Figure 2:
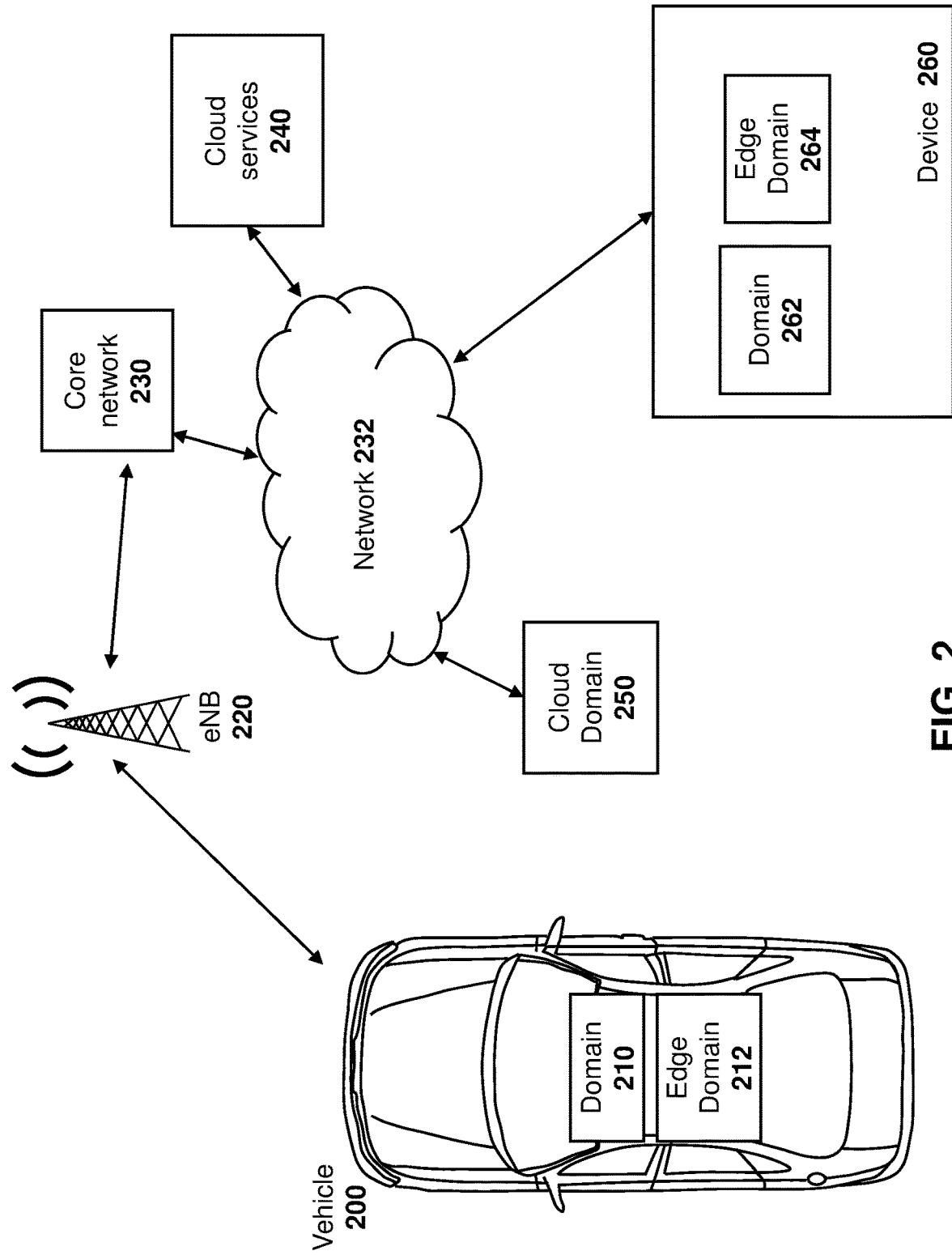
FIG. 2 is a block diagram showing a system for use with the embodiments of the present disclosure.

Reference is now made to FIG. 2, which shows an example deployed system showing various generators and consumers of insights. The embodiment of FIG. 2 is merely provided for illustration purposes, and in some cases fewer participants in a system will exist. In other cases, more participants in a system will exist.

In the embodiment of FIG. 2, a vehicle 200 may be equipped with a computing system and a communications system. Part of the computing system may include a domain 210, which, as described below, may have applications that consume insights. Further, part of the computing system on vehicle 210 may include an edge domain 212. In some embodiments, edge domain 212 may generate insights. However, in other cases, insights may be generated within domain 210 or consumed within edge domain 212.

In the example of FIG. 2, vehicle 200 communicates utilizing a communications system with an access point, such as a cellular base station, shown in FIG. 2 as eNB 220. The base station may communicate with a core network 230 which may then forward communications through a network 232 to a cloud services provider 240. Network 232 may, for example, be a wide area network such as the Internet.

In other embodiments, rather than a core network 230, any technology associated with a particular cellular or wireless communications protocol may be used.

In some embodiments, cloud services 240 may provide developer Software Development Kits (SDKs), edge node interfaces, among other services.

In some embodiments, a cloud domain 250 may generate or consume insights. Cloud domain 250 may communicate through network 232 with a cloud services provider 240 and may communicate with other domains such as domain 212 on vehicle 200 in some cases.

Further, rather than a vehicle, a device 260 may consume insights. Device 260 may be any computing device capable of generating or consuming such insights, and could include Internet of Things devices, mobile devices, medical equipment, vehicles or equipment associated with vehicles, among other options.

Device 260 may communicate through network 232 utilizing various wired or wireless technologies, including but not limited to Ethernet, fiber, cellular, Wi-Fi, satellite, among other options.

Device 260 may include a domain 262 which may, in some embodiments, consume insights. Further, device 260 may include an edge domain 264 which may, in some cases, generate insights. However, in other cases, domain 262 may generate insights and edge domain 264 may consume insights.

Further, while the embodiment of FIG. 2 shows only two domains within vehicle 200 or device 260, in practice only one or many domains may exist within the vehicle 200 or the device 260, and the present disclosure is not limited to only having two domains within any particular device. In particular, a device 260 may be solely used for generating insights, in which case it will have only a single domain. In other cases, device 260 may solely consume insights and again have only one domain. In other cases, a device 260 or vehicle 200 may have a plurality of domains along with edge domain 212.

Figure 3:
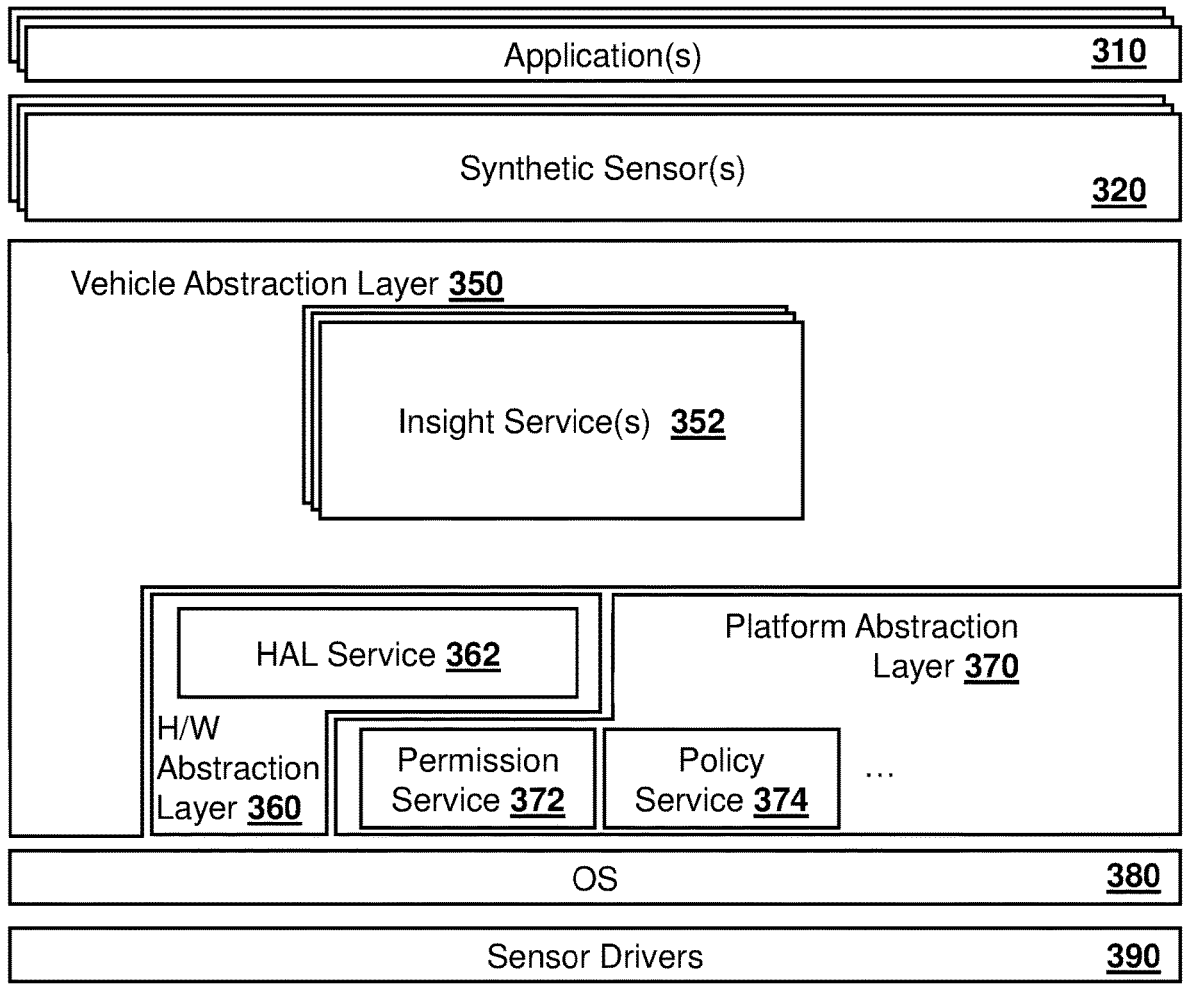
FIG. 3 is a block diagram showing an example system for providing insights using synthetic sensors.

Each domain or edge domain may have an architecture that is OS-agnostic. Specifically, the domains shown in FIG. 2 may be implemented on a variety of domains, where different domains may have different operating systems. For example, in vehicle systems, different vehicle manufacturers may use different operating systems. Therefore, a system architecture for an edge domain may use abstraction layers to allow the system to be implemented on different platforms. Reference is now made to FIG. 3.

In the embodiment of FIG. 3, applications 310 may be part of an applications layer. An application may in some cases be user facing and utilize synthetic sensors 320 to obtain insights. In other cases, an application could be a security service that monitors for reported anomalous behavior.

Synthetic sensors 320 are part of a synthetic sensor framework. In particular, developers may use the synthetic sensor framework to build synthetic sensors. The framework exposes a mechanism to define actions for lifecycle events, services for request/response application program interface (API), among other actions.

The framework of FIG. 3 may further define mechanisms for authentication and authorization of requests and events based on policies. When the synthetic sensor is installed/uninstalled/updated, an Install & Update Service may interact with a Permission Service to update the authentication and authorization policies.

Synthetic sensors 320 may communicate, for example, through an interface with a vehicle abstraction layer (VAL) 350. Vehicle abstraction layer 350 provides insightful, value-added interfaces for access to vehicle data. It accesses sensor drivers and hardware via a hardware abstraction layer 360.

The vehicle abstraction layer 350 further provides access to insights based on vehicle data. Insights are inferences based on the vehicle data and may be as simple as aggregation or as complex as a machine learning model.

Insights may therefore be provided as part of insight services 352 in the embodiment of FIG. 3. Such insight services 352 control access to a normalized form of vehicle data and provide value added inferences.

Insight Services generally do not interact directly with sensor hardware to access sensor data, instead they leverage the hardware abstraction layer 360. This separation provides a clear distinction between the responsibilities of the hardware abstraction layer 360 (sensor integration and normalizing sensor data) and the vehicle abstraction layer 350 (managing access to vehicle data and providing value-add insights).

Insight services 352 may leverage sensor data from multiple hardware abstraction layers in order to provide vehicle abstraction and value-add insights. Synthetic sensors 320 may generate further insights based on the insights/inferences provided by the insight services 352. In some cases, a synthetic sensor may generate further insights based on the insights provided by another synthetic sensor.

The hardware abstraction layer (HAL) 360 is focused on the integration of sensors, the normalization of sensor data, and is a barrier between safety certified and non-certified software. In the embodiments of the present disclosure, eBPF data may be considered sensor data. The integration and normalization may be done through HAL services, where each HAL service 362 may provide three key functions, namely integration to the underlying sensor; normalization of the sensor data; and, if required, providing a barrier between the safety certified and non-certified software Further, returning to insight service 352, one of the key functions of the insight service is to enforce access control to normalized sensor data and insights. In order to validate the authentication and authorization of service clients the vehicle abstraction layer services leverage the policy service 374 and Permission Service 372 from the platform abstraction layer 370.

While the hardware abstraction layer discussed above describes hardware integration, the platform abstraction layer (PAL) 370 encapsulates key aspects of the underlying operating system 380 and platform that allow the system to be ported to different platforms by: defining consistent interfaces to key platform functionality; encapsulating underlying OS specifics into an OS binding component; and supporting high-level/course-grained abstractions beyond the rudimentary OS capabilities.

PAL interfaces are exposed both internally to the HAL and VAL and externally to clients such that the power and portability of these components is extended to clients.

The PAL 370 may have various services. A Permission Service 372 and a policy service 374 are shown in the embodiment of FIG. 3. In some cases, other services such as a lifecycle service, a process service and an install and update service may further be provided.

In particular, policy service 374 is responsible for persisting policy values; performing policy queries; notifying policy changes; resolving policy priority; and controlling policy modification. Policies here deal with configuring the behavior of various components, and each policy may have a unique name, a string encoded configuration value, and a priority.

Permission service 372 is the central authority for the domain permissions. Service capabilities that are protected by a permission leverage the Permission Service in order to determine whether the appropriate permissions have been granted or not. In one embodiment, the permission system authentication is underpinned by the Portable Operating System Interface (POSIX) process user and group assignments (UID/GID). The Permission Service identifies/authenticates components based on the UID assigned to their process in the underlying operating system. This UID is carried by the underlying operating system and is deemed legitimate (accessed and managed by the underlying OS using proven/trusted schemes).

Vehicle Security Instrumentation

In accordance with the embodiments of the present disclosure, operating system level event monitoring data may be collected and passed to a synthetic sensor system stack for processing. In some cases, the operating system level event monitoring data may be part of a cockpit controller architecture in which an operating system guest and the intrusion detection system are separately initiated, for example on an operating system hypervisor.

During normal operation, when no attacker is present on the system, the operating system level event monitoring data is collected and passed to the synthetic sensor system stack for processing.

In the case where an attacker has already compromised the system, through a means that avoided preventative measures, the intrusion detection system solution described below may detect the presence of the attacker through the behavior that the attacker exhibits. For example, attacks including a shell being initiated, a discovery action being executed, a lateral movement, among other actions that may be detected.

When anomalous activity is detected, one or more alerts may be generated. These alerts can be used as a base for executing a response playbook and/or forwarding information to a Security Operations Center for analysis.

Figure 4:
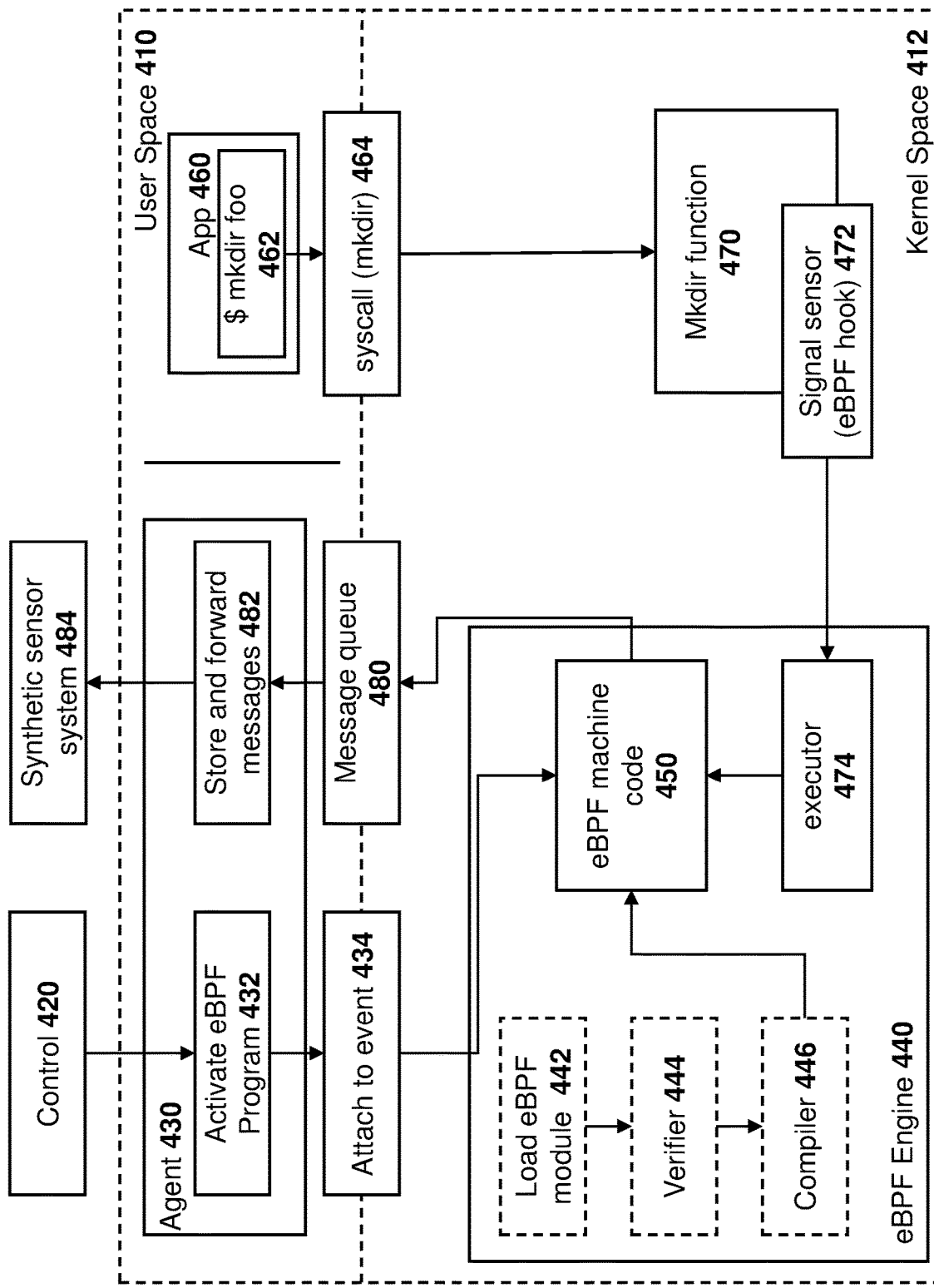
FIG. 4 is a block diagram showing the generation of security sensor information.

In this regard, in a first aspect of the present disclosure, the operating system may be tooled to provide data with regard to behaviors running on the operating system. Reference is now made to FIG. 4.

The embodiment of FIG. 4 provides a block diagram showing a user space 410 and a kernel space 412. The object of the embodiment of FIG. 4 is to provide sensor data to a synthetic sensor that can then interpret the data to look for anomalies. The user space 410 and the kernel space 412 can be implemented in the vehicle.

During startup, a control block 420 may provide a command to an agent 430, and in particular to an activate eBPF program 432, to start an eBPF engine 440. The command may flow through and attach to event block 434 between the user space 410 and kernel space 412 to start the eBPF machine code 450.

The starting of the eBPF machine code 450 may comprise a load eBPF module 442, which may send signals to a verifier 444, and to a compiler 446 in order to start the eBPF machine code 450.

In particular, during the operating system boot, all eBPF programs are loaded. These programs may be binary objects, for example built on an Android build system from C programs accompanied with Android.bp files in the Android source tree, when implemented in an Android operating system. The build system stores the generated objects, and they may become part of the system usage. The load eBPF module 442, verifier 444, and compiler 446 are components involved in the loading and preparation process of eBPF modules.

Once the eBPF engine 440 and agent 430 are running, in the example of FIG. 4, an application 460 tries to run a system call to make a directory. This is shown as $mkdir foo block 462.

The call proceeds to a mkdir function 470 within kernel 412. An eBPF hook 472 functions as a signal sensor and detects the system call. In this regard, a signal is provided to an executor 474 within the eBPF engine 440.

Executor 474 provides the information to the eBPF machine code 450, which then may provide output to a store and forward message block 482 with an agent 430 by using message queue 480. Message queue 480 exists between the user space 410 and the kernel 412.

In further embodiments, the eBPF sensors could be implemented on a microkernel. For example, in the embodiment of FIG. 4, the kernel is merely relaying a blocking message from one user process to another, where the second process is a filesystem implementation.

Further, while the present disclosure teaches eBPF, other technology could be used to intercept system calls, including but not limited to auditd and ftrace.

Store and forward message block 482 may then provide data to the synthetic sensor system 484, as described below with regard to FIG. 7.

As will be appreciated by those in the art, the eBPF sensors may be limited in program size. In this regard, various system calls or groups of system calls may have their own eBPF sensor. One example of groupings is shown in Table 1 below. The signal sensor 472 can be any of the eBPF sensors in Table 1. The kernel space 412 can include multiple eBPF sensors.

TABLE 1 eBPF Sensor Detection Events

| eBPF Sensor | Detection Events |
| --- | --- |
| Process | Create |
|  | Exit |
|  | Clone |
| File | Open |
|  | Link |
|  | Unlink |
|  | Rename |
|  | Dup |
|  | Stat |
|  | Select |
|  | Select_ret |
|  | Write |
| Network | Connect |
|  | Accept |
|  | Close |
| Memory | mmap |
|  | munmap |
| File System | mount |
|  | unmount |
| Epoll | epoll |
|  | epoll_ret |
| Signal | signal |

Referring again to FIG. 4, the agent 430 is responsible for both activating eBPF programs and handling signal sensor data, for example using blocks 432 and 482. Agent 430 provides a means of activating eBPF programs that were automatically loaded at kernel boot time as well as format and persist the signal sensor data. However, in some embodiments the eBPF sensors could be loaded dynamically when desired. While such dynamic loading may not typically be used in a security instrumentation scenario, it may be used if the security instrumentation is being upgraded without rebooting. Further, some systems, such as Android, may be secured to prohibit dynamic loading and would require a secure update to the entire system image.

In operation, agent 430 may be loaded and run as a persistent privileged program during the boot up sequence for the operating system. In some cases, the order of events may need to be decided between the computing device manufacturer and the agent creator. However, in general, the agent 430 may be loaded after the eBPF programs are loaded by the kernel 412 and before any user space 410 programs are started.

Output from the store and forward messages block 482 may be formatted, for example, utilizing a JavaScript Object Notation (JSON) schema. Such schema may be defined based on the type of information being output and needed within the synthetic sensor system 484.

For example, the eBPF engine 440 may look for a process create function and output a JSON file as shown with Table 2.

TABLE 2

Example process-create schema

```
[
  {
    "device_id": "0000-0000",
    "hostname": "localhost",
    "product": "siivy-0.1" ,
    "tz_offset": "EDT-0400",
    "event": {
```

TABLE 2-continued

Example process-create schema

```
      "category": "process",
      "type": "create",
      "time": "2022-04-26T14:05:09+00:00"
    },
    "process": {
      "name": "mount",
      "argv": ["/usr/bin/mount", "-t", "debugfs", "none",
        "/sys/kernel/debug"],
      "pid": 3923,
      "ppid": 3917,
      "cpu": 2,
      "ret": 0,
      "kernel_time": 0,
      "uid": 1234
    }
  }
]
```

As will be appreciated by those skilled in the art, each element within the output could have a definition. For example, the host name may be of type "string" and have a description that is the name of the host the signal sensor is running on. The "pid" Is the process identifier of the created process and may be of type "integer". The fields under "process" describe the information of the created process. The other elements within the output would similarly have type definitions and descriptions, and in some cases have defined values.

Similarly, an example for a file memory map JSON schema is shown below with regard to Table 3.

TABLE 3

Example file-mmap schema

```
[
  {
    "device_id": "0000-0000",
    "hostname": "localhost",
    "product": "siivy-0.1" ,
    "tz_offset": "EDT-0400",
    "event": {
      "category": "mmap",
      "type": "mmap",
      "time": "2022-04-26T19:27:35+00:00"
    },
    "process": {
      "name": "python3",
      "pid": 4182,
      "ppid": 4136,
      "cpu": 0,
      "ret_err": 0,
      "kernel_time": 0,
      "uid": 1234
    },
    "file": {
      "name": "",
      "addr": 0,
      "length": 8392704,
      "prot": "0x0",
      "prot_int": 0,
      "flags":"MAP_PRIVATE|MAP_ANONYMOUS|MAP_STACK",
      "flags_int": 131106,
      "size": 123,
      "fd": 4294967295,
      "offset": 0,
      "retaddr":"129493270769664",
      "uid": 123445
    }
  }
]
```

As seen in Table 3, process and file information is provided as part of the schema in the fields under "process" and "file".

Other formats could similarly be used, and the examples of Table 2 and 3 are merely provided for illustration about possible sensor output formats.

Further, in some embodiments, the signal sensor data may be wrapped in a Connected Vehicle Systems Alliance (COVESA) Vehicle Signal Specification (VSS). Specifically, the VSS specification provides a means for OEMs to define custom signals in a Private.vspec file. Thus, the security instrumentation signals that may be provided based on the embodiment of FIG. 4 may be defined as VSS signals. One example implementation is provided in accordance with Table 4 below.

TABLE 4

Example COVESA VSS private signals

The Private branch.
OEM unique data may be added here.
Security:
  type: branch
  description: Vehicle Security Instrumentation
Security.ABC_Corp:
  type: branch
  description: ABC_Corp Security Instrumentation
Security. ABC_Corp.SignalSensor:
  type: branch
  description: Security Instrumentation Signal Sensor
Security. ABC_Corp.SignalSensor.Process:
  type: branch
  description: Signal Sensors for process events
Security. ABC_Corp.SignalSensor.Process.Create:
  datatype: string
  type: sensor
  description: Signal Sensor for process create events
Security. ABC_Corp.SignalSensor.Process.Exit:
  datatype: string
  type: sensor
  description: Signal Sensor for process exit events
Security. ABC_Corp.SignalSensor.Process.Clone:
  datatype: string
  type: sensor
  description: Signal Sensor for process clone events
Security. ABC_Corp.SignalSensor.File:
  type: branch
  description: Signal Sensors for file events
Security. ABC_Corp.SignalSensor.File.Open:
  datatype: string
  type: sensor
  description: Signal Sensor for file open events
Security. ABC_Corp.SignalSensor.File.Link:
  datatype: string
  type: sensor
  description: Signal Sensor for file link events
Security. ABC_Corp.SignalSensor.File.Unlink:
  datatype: string
  type: sensor
  description: Signal Sensor for file unlink events
Security. ABC_Corp.SignalSensor.File. Rename:
  datatype: string
  type: sensor
  description: Signal Sensor for file rename events
Security. ABC_Corp.SignalSensor.File.Dup:
  datatype: string
  type: sensor
  description: Signal Sensor for file dup events
Security. ABC_Corp.SignalSensor.File.Stat:
  datatype: string
  type: sensor
  description: Signal Sensor for file stat events TABLE 4-continued Example COVESA VSS private signals Security. ABC_Corp.SignalSensor.File.Select:
  datatype: string
  type: sensor
  description: Signal Sensor for file select events
...

Table 4 therefore provides a subset of possible COVESA private VSS definitions for security. The payload can be JSON formatted signal sensor data, for example.

Figure 5:
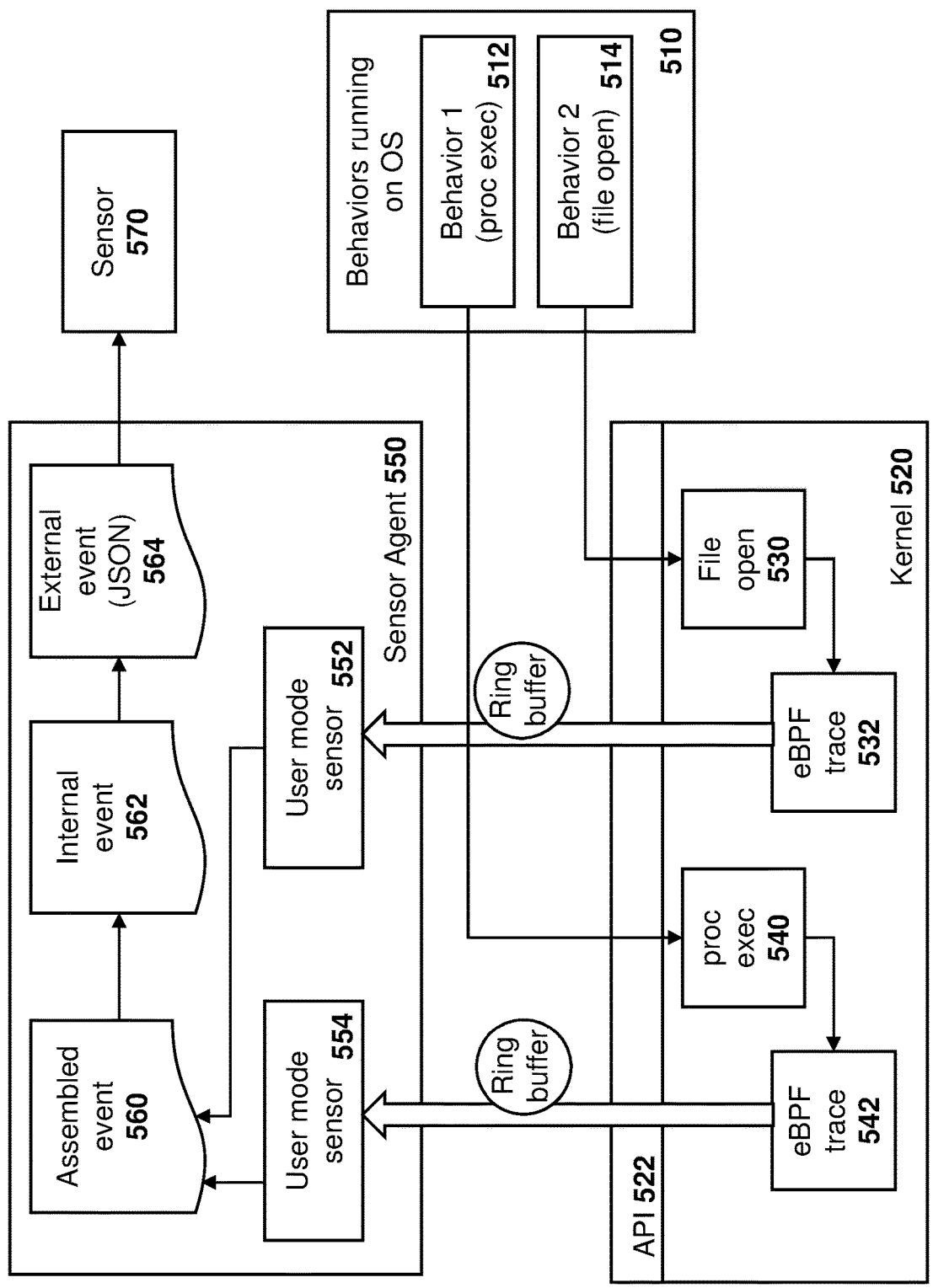
FIG. 5 is a block diagram showing another example of the generation of security sensor information.

The above is further demonstrated with regards to FIG. 5. The kernel 520 and the sensor agent 550 can be implemented in the vehicle. In particular, in the embodiment of FIG. 5, a plurality of behaviors may be running on an operating system, as shown by block 510. For example, a process execution is shown at block 512 and a file open behavior is shown at block 514.

The file open causes a file open function 530 at the kernel 520 to be executed. This can be done, for example, through the kernel API 522. A trace, such as eBPF trace 532, can monitor the file open function 530 and produce data when the function is executed.

Similarly, the process execution causes a process execution function 540 at the kernel 520 to be executed. A trace such as eBPF trace 542 can monitor the process execution function 540 and produce data when the function is executed.

As will be appreciated by those skilled in the art, the eBPF trace 532 and 542 are pieces of code that are run in various processes. Again, every system call or various groupings of system calls may have their own eBPF sensor.

The output from traces 532 and 542 can be provided to a storage, such as a ring buffer. Further, a sensor agent 550 may have a plurality of user mode sensors, shown at blocks 552 and 554 in the embodiment of FIG. 5. Typically, a single user mode sensor will be associated with a single trace element.

User mode sensors may have various functionality. For example, they may decode strings, decode flags, add additional information, among other functionality.

Output from the user mode sensors 552 and 554 may be provided to an assembly block 560, which creates an assembled event. Specifically, a process may have a plurality of steps, which may be executed at various points by kernel 520. Assembly block 560 may assemble those steps into a dictionary representing event. Further, assembly block 560 may aggregate many events over a period of time to send only an aggregate every second or several seconds, especially in cases where there may be thousands of expected events per second within that sensor. Example aggregations may include: a simple count, a keyed bin count (e.g. ("/proc": count), a histogram (key range) count (e.g. (length 0-100: count)), the sum of an numeric parameter (e.g. length), among other options.

The assembled event from block 560 may be provided to an internal event processor 562, which may format the dictionary based event and provide it to an external event processor 564.

External event processor 564 is configured to create the output formats that are for example described with regard to Tables 2, 3 and 4 above.

The output from the external event processing block 564 may then be provided to a sensor such as synthetic sensor, shown as block 570 in the example of FIG. 5.

Figure 6:
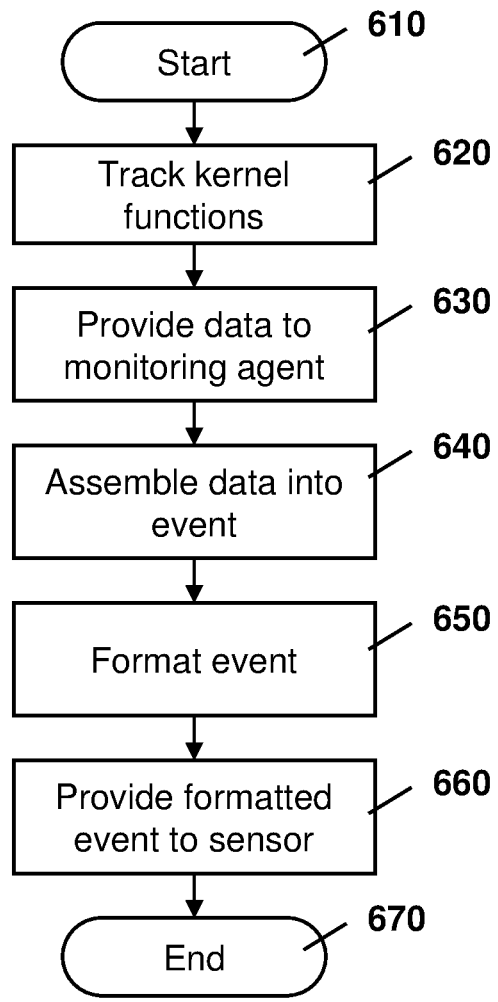
FIG. 6 is a process diagram showing the creation of security event data based on kernel tracing.

The process of monitoring the kernel and providing formatted event sensor data is shown with regard to FIG. 6. In particular, the process of FIG. 6 starts at block 610 and proceeds to block 620 in which kernel functions are monitored. This can be done, for example, by placing an eBPF trace on the various kernel functions.

The process then proceeds to block 630 in which the data may be provided to a monitoring agent. For example, this may include the user node sensors within an agent which may monitor ring buffers from the eBPF trace code.

The process then proceeds to block 640 in which various pieces of data that are monitored at block 630 are assembled into an event.

The process then proceeds to block 650 in which the assembled information is formatted. For example, the formatting may comprise of code that serializes the data to create an output that complies with the desired JSON schema. The formatting may further comprise utilizing a private VSS schema to create security signals. Other options for the formatting at block 650 are possible.

The process then proceeds to block 660 in which the formatted event data is provided to a sensor. In some cases, this may be done by publishing formatted data to a monitoring function which include synthetic sensors. In some cases, this may be done by publishing the sensor data onto a bus such as a CANbus. Other options are possible.

From block 660 the process proceeds to block 670 and ends.

Based on the above, a process is provided for injecting an eBPF program into the kernel to trace function calls and provide an output, which can be then formatted as a sensor event. In some embodiments, the sensor event can be for the in-vehicle infotainment system, which for example may be running on an Android system. In this case, the Android based in-vehicle infotainment Linux kernel can use the eBPF technology for tracing system calls. However, other options, operating systems and tracing are possible.

Intrusion Detection System (IDS)

Figure 7:
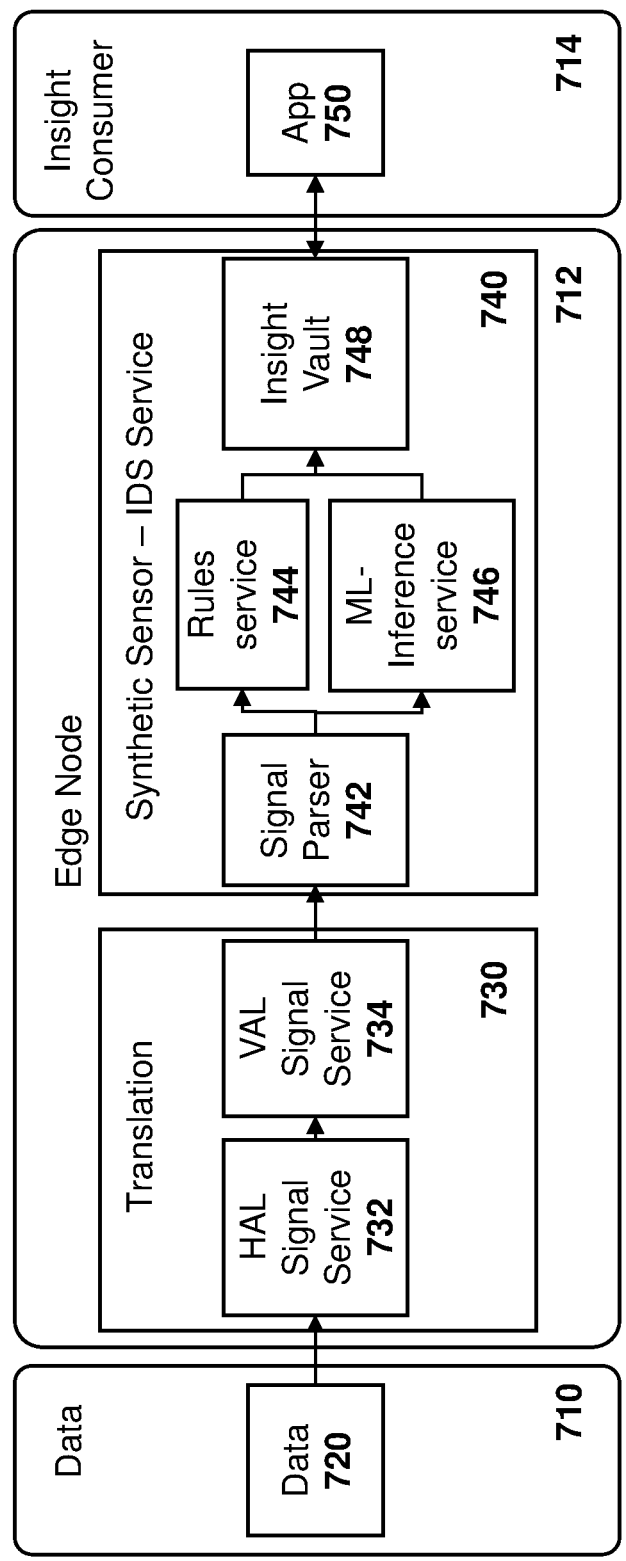
FIG. 7 is a block diagram showing the consumption of security sensor information by a synthetic sensor to generate security insights.

Reference is now made to FIG. 7. Security instrumentation data is captured, for example, in the in-vehicle infotainment system as described above with regard to FIGS. 4 to 6. This is shown as data source 710 with a data block 720. As will be appreciated by those in the art, data block 720 can feed real-time signals to the remainder of the intrusion detection system in some cases. In some cases, data block 720 may be a file where security instrumentation data has been captured and is then played back to the remainder of the intrusion detection system.

The data source may be on a computing device that differs from the computing device that does the processing for the synthetic sensor, which is shown in the embodiment of FIG. 7 as an edge node 712. Further, the consumer of the insights from the synthetic sensor may also be on a different computing device, shown as insight consumer 714. In other cases, rather than a different computing device, the processes may be running on different virtual machines, for example on a hypervisor. The edge node 712 can be implemented in the vehicle. Other options are possible.

Data from block 720 can be provided to a translation layer 730 within the synthetic sensor system stack on edge node 712. Translation layer 730 is responsible for normalizing the data from block 720 for a synthetic sensor. In particular, data source 710 can include various vehicles running different computing devices, different infotainment systems, using different sensors and therefore, even though data block 720 may be formatted in a specific way, the data may still need to be normalized.

In this regard, translation layer 730 includes a hardware abstraction layer (HAL) signal service 732 and a vehicle abstraction layer (VAL) signal service 734. Data from block 720 may therefore pass through HAL signal service 732 and VAL signal services 734 to normalize the data into a format that a synthetic sensor could process.

Once normalized, the data may be passed to the synthetic sensor 740. In the embodiment of FIG. 7, synthetic sensor 740 is an intrusion detection system synthetic sensor that receives security instrumentation data.

The normalized data from the VAL signal service 734 is provided to a signal parser 742 within the synthetic sensor 740. Signal parser 742 as a component task with preparing raw signals that were received from the VAL signal service 734 into a suitable format for further processing.

For example, signal parser 742 may be a service that is subscribed to a Vehicle Signal Specification (VSS) tree and VAL signal service 734 may send signal parser 742 any signals defined in the tree below the node that has been subscribed to by the signal parser 742. In the embodiments of the present disclosure, signal parser 742 may be subscribed to all Vehicle.Private.Security.ABC_Corp.SignalSensor events, such as those outlined in Table 4 above, for example.

In some embodiments, raw signals will have a payload as an Android kernel event, collections of Android kernel events, or a statistical summary of Android kernel events, among other data. Signal parser 742 may then digest the raw events and parse the payloads of the single event, collection of events or statistical summary of events appropriately. In some cases, the output may include the time of the event, the type of event and additional information stored in the payload.

If EQL is used, signal parser 744 may create Event Query Language (EQL) events, specifying the time of the event, the type of event and passing as data the payload of the raw signal, for example.

From the signal parser 742, data may be passed to one or both of a rules service 744 and a machine learning inference service 746. Each is described below.

Rules Service

Rules service 744 is a component used to implement rule based detection of anomalous situations. In some cases, the rules may be written in an EQL with a modified engine to support attribution of events to triggered rules. However, other options are possible.

Rules service 744 may have a rules engine that can run through a list of rules to detect anomalies and flag events as they match any of the rules. Thus, the rules engine is essentially performing pattern matching. As used herein, an anomaly may consist of code defined as malicious behavior in a rule, among other options.

For example, various rules are illustrated in Table 5 below. However, the rules in Table 5 are merely provided for illustration, and in practice more rules or different rules could be used.

TABLE 5

Example Rules

| Name of Rule | Description | EQL query (Linux) |
|---|---|---|
| Linux SSH Destination Port Mitre T1021 | Detects the lateral movement technique of establishing an SSH session via port 22 | 'network where dport==22 or sport==22' |
| System Information Discovery Mitre T1082 | Detects techniques used to identify the operating system and kernel versions running on | "process where event=='create' and ( stringContains(command_line, 'systemsetup') or stringContains(command_line, 'ls –al /Applications') or stringContains(command_line, 'uname –a') or stringContains(command_line, 'cat /etc/lsb-release') or stringContains(command_line, 'cat /etc/os-release') or stringContains(command_line, 'cat /etc/redhat))" |
| Linux Sudo Caching Mitre T1206 | Monitors for modifying of the sudoers file | "process where (stringContains(command_line, '/usr/bin/sed') or stringContains(command_line, '/usr/sbin/visudo') or stringContains(command_line, '/usr/bin/sh –c')) and (stringContainsWord(command_line, '/etc/sudoers') or stringContainsWord(command_line, '/etc/passwd'))" |
| Linux RemoteServices SSH SMB VNC Mitre T1021 | Detects interactions with Remote Services such as SMB, SSh or VNC | "process where event=='start' and (stringContains(command_line,'bin/smbmount') or stringContains(command_line,'bin/smbclient') or stringContains(command_line, 'bin/mount –smbfs') or stringContains(command_line, 'bin/ssh') or stringContains(command_line,'bin/vnc') or stringContains(command_line,'bin/vncviewer')) and not stringContains(command_line, '/usr/sbin/ssh') |
| Linux Setuid Setgid Chmod Conv Mitre T1166 | Check to see if setuid/setgid permissions are being added to files | "process where event=='create' and ((stringContains(command_line, 'chmod') and (stringContainsWord(command_line, '4777') or stringContainsWord(command_line, 'u+s') or stringContainsWord(command_line, 'g+s'))) or stringContains(command_line, 'chown root')) |
| Linux Process Discovery Mitre T1057 | Detects a technique of enumerating Processes | "process where event=='create' and ( (stringContains(command_line, '/bin/ps aux')) or (stringContains(command_line, '/proc') and (stringContains(command_line, '/bin/ls') or stringContains(command_line, '/bin/cat')))" The process is then split into two rules: "process where event=='create' and process_name=='ps'" And "process where event=='create' and stringContains(command_line, '/proc') and (stringContains(command_line, '/bin/ls') or stringContains(command_line, '/bin/cat'))" |
| Linux Hosts File Modification Mitre T1565 | Detects if/ etc/hosts has been modified | "file where (event=='open' or event=='rename' or event == 'unlink') and (filename == '/etc/hosts' or pathname == '/etc/hosts' or oldpath == '/etc/hosts'") |

As would be appreciated by those in the art (event type, event name) could be concatenated together into a new event type. This would make the EQL slightly different but equivalent, so "process where event=='create' and stringContains (command_line, 'systemsetup')" would instead look like "process_create where stringContains(command_line, 'systemsetup')".

Other options for events are possible.

Thus the rules engine in rules service 744 can check the event against the rules. For example, the first rule (Linux SSH DestinationPort Mitre T1021) checks if in a network event there was an attempt to access destination port 22. The rules engine merely checks if the value stored in a network event for dsport is 22.

Specialized functions for rules service 744 may further be defined. For example, two specialized functions may include the function StringContains and StringContains Word.

The function StringContains(a,b) is an EQL function that returns true if b is a substring of a and false otherwise.

The function StringContainsWord(a,b) is a function that returns true if b is a word present in the string given by a and false otherwise.

As indicated above, other rules and specialized functions may be defined within rules service 744.

When a rule is triggered, an alert is generated, and may be passed to insight vault 748. In one case, the rule may be JSON encoded using an Intrusion Detection Message Format (IDMF) schema.

One example of the JSON definition of the IDMF schema is shown in Table 6 below.

TABLE 6

Example JSON Definition for IDMF Schema

{
"SchemaVersion": < chemaVersion>,

TABLE 6-continued

Example JSON Definition for IDMF Schema

"ObjectType": <objectType>,
"Id": <guid>,
"DetectTime": <detectTime>,
"CreateTime": <createTime>,
"TrxTime": <trxTime>,
"Device": <device>,
"Product": <product>,
"Detector": <detector>,
"References": <references>,
"DetectionAssesment": <detectionAssesment>
"Detection Rule": <detectionRule>,
"TriggeringEvents": <triggeringEvents>
}

The elements in Table 6 may have the following types and descriptions, shown in Table 7.

TABLE 7

Field Definitions for IDMF Schema

| Field | Type | Description |
|---|---|---|
| SchemaVersion | String | Version of this Detection format (for example: 1.0.0.0). |
| ObjectType | String | Set to "Detection" |
| Id | String | GUID of the Detection |
| DetectTime | String (timestamp) | Time when Detection was created |
| CreateTime | String (timestamp) | The time when the event was created (at signal level). For complex rules, the time when the final state was triggered. |
| TrxTime | String (timestamp) | Current time when Detection gets emitted (for example as response to a onRequest( ) procedure call). |
| Device | SoftwareSummary | Information about the software running at the end point. |
| Product | SoftwareSummary | Information about the product that generated the Detection. |
| Detector | DetectorSummary | Information about the rule that generated the Detection. |
| References | Array(string) | Information related to classification of the alert, for example external references like CVEs etc. |
| DetectionAssessment | AssessmentSummary | Information about Detection category, severity. |
| DetectionRule | String | The query from detection rule that was used for detection. |
| TriggeringEvents | Array (eventPayload) | The states (events) that led to this Detection triggering. |

In Table 7 above, SoftwareSummary may be a generic object to describe the version of something. DetectorSummary may identify a Rule that triggered the Detection. AssessmentSummary may define a detection category and severity, which may be an enumerated list of severities.

However, the schemas provided in Tables 6 and 7 above are merely examples, and other schemas could be used.

Machine Learning Inference Model

In addition to utilizing a rules service 744, or instead of using rules service 744, a machine learning (ML) inference service 746 may be used to detect anomalies. The machine learning inference service 746 is a component implementing machine learning based detections.

In particular, a machine learning model may be trained on a data set with known normal behavior and anomalous behavior. Thereafter, the inference model can be implemented on the computing device and data provided through such inference model to create inferences on whether behavior is normal or anomalous.

Examples of machine learning models may include One Class support vector machine (SVM), Local Outlier Factor, Isolation Forest, Auto Encoders, Embedding Models, Clustering Algorithms, among others for anomaly detection. For example, one option for a machine learning model is described in U.S. patent application Ser. No. 18/083,102, entitled "METHOD AND SYSTEM FOR INCREMENTAL CENTROID CLUSTERING", the contents of which are incorporated herein by reference.

As will be appreciated by those skilled in the art, machine learning is good at generalizing behavior and may catch bad behavior that are difficult to classify. In this regard, in some cases the machine learning inference model may catch zero day vulnerabilities. It may also detect things such as cryptojacking, forced password cracking, fuzzing, among other such behaviors.

In some embodiments, the machine learning inference service 746 can be used in parallel with rules service 744 when both are being used. In other cases, when both rules service 744 and machine learning interface service 746 are used, the processing at rules service 744 and the processing performed by the machine learning inference service 746 may be performed sequentially.

When a machine learning inference detection is made, an alert may be generated and a JSON encoding IDMF schema may be passed to insight vault 748. One example of JSON encoded IDMF schema is described above with regard to Tables 6 and 7.

Insight Vault and Consumer

Alerts from rules service 744 and/or machine learning inference service 746 are provided to insight vault 748. Insight vault 748 is the component responsible for persistence of generated insights, as well as handling requests from insight consumers.

In some embodiments, insight vault 748 may be a database or some other persistent store. In some embodiments, insight vault 748 may be a file with rule-triggering events. Other options for storage at insight vault 748 are possible.

Events stored in the insight vault 748 may be provided to an insight consumer 714, and in particular to an application 750 that is registered to obtain insights from insight vault 748.

The events within insight vault 748 may be pushed to the application 750. In other cases, application 750 may make requests of the insight vault 748. Such requests may be structured and define the type of information, format of information or other search criteria within insight vault 748.

Figure 8:
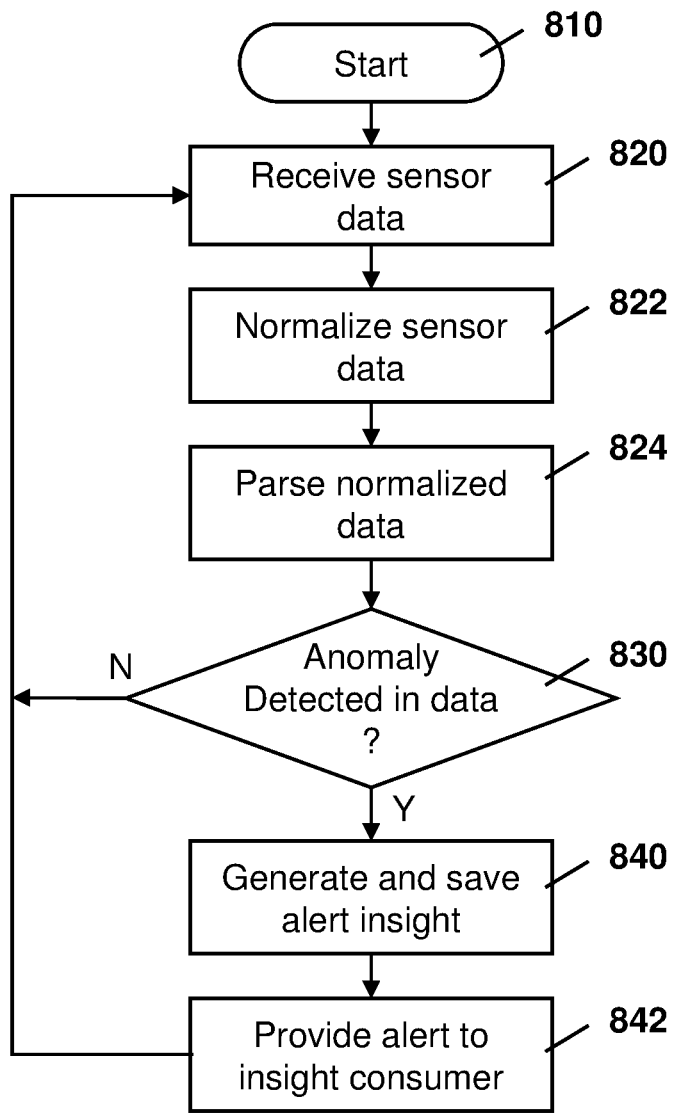
FIG. 8 is a process diagram showing the consumption of security event data to create insights regarding security alert.

Therefore, the process of FIG. 7 may be summarized with regard to the embodiment of FIG. 8.

The process of FIG. 8 starts at block 810 and proceeds to block 820 in which sensor data is received. For example, the sensor data may be received from a security sensor as described above with regard to FIGS. 4, 5 and 6.

The process then proceeds to block 822 in which the sensor data may be normalized, for example at a translation layer within the synthetic sensor stack.

The process then proceeds to block 824 in which the normalized data may be parsed, for example utilizing a signal parser.

The process then proceeds to block 830 in which a check is made to determine whether any anomalies are detected in the data. As provided above, anomalies may be when rules are triggered or based on detected behaviors. The check at block 830 may be performed by a rules service, machine learning inference service, or both.

If no anomalies are detected, the process may proceed back to block 820 to continue to receive sensor data.

Conversely, if an anomaly is detected and then the process may proceed to block 840 in which an alert may be generated and saved. Such alert may be considered to be an insight from the synthetic sensor.

The process then proceeds to block 842 in which the alert may be provided to an insight consumer. For example, the mere generation and saving of the alert may cause a push notification to be sent to an insight consumer that has previously registered to obtain insights from the synthetic sensor. Such insight consumer may, for example, be a security operations center for a vehicle manufacturer, fleet operator, corporation or owner of a vehicle, among other options.

In some cases, the provision of the alert at block 842 may be based on a query to an insight vault. The query may be structured to provide certain information from the data stored within the insight vault, including a type of alert, age of an alert, the rules that created the alert, a sequence of the alert (e.g. provide the last 5 alerts received), among other options.

Based on the above, a system is provided in which sensor signals are created for security alerts and in which a synthetic sensor may look for such sensor outputs to determine whether an anomalous condition exists. This may be done in vehicles, which have a plurality of computing devices, different processing capabilities, different virtual machines, use a hypervisor, among other variabilities. In particular, some parts of an automotive environment may be safety certified, and by pushing information to other system elements, the synthetic sensor aspects do not need to be certified.

Further, the use of a synthetic sensor allows for additional security. In particular, even if a bad actor breaks into a first system, it is difficult to disable the scanning system since this is performed on another virtual machine or computing device.

The above therefore provides a mechanism to both monitor kernel actions and provide data as security sensor data, and to interpret such security sensor data in an intrusion detection system to detect and flag anomalies.

Hardware

The above nodes, domains, computing devices, platforms, electronic control units, or other computing systems may be implemented using any computing device. One simplified diagram of a computing device is shown with regard to FIG. 9. The computing device of FIG. 9 could be any fixed or mobile computing device.

Figure 9:
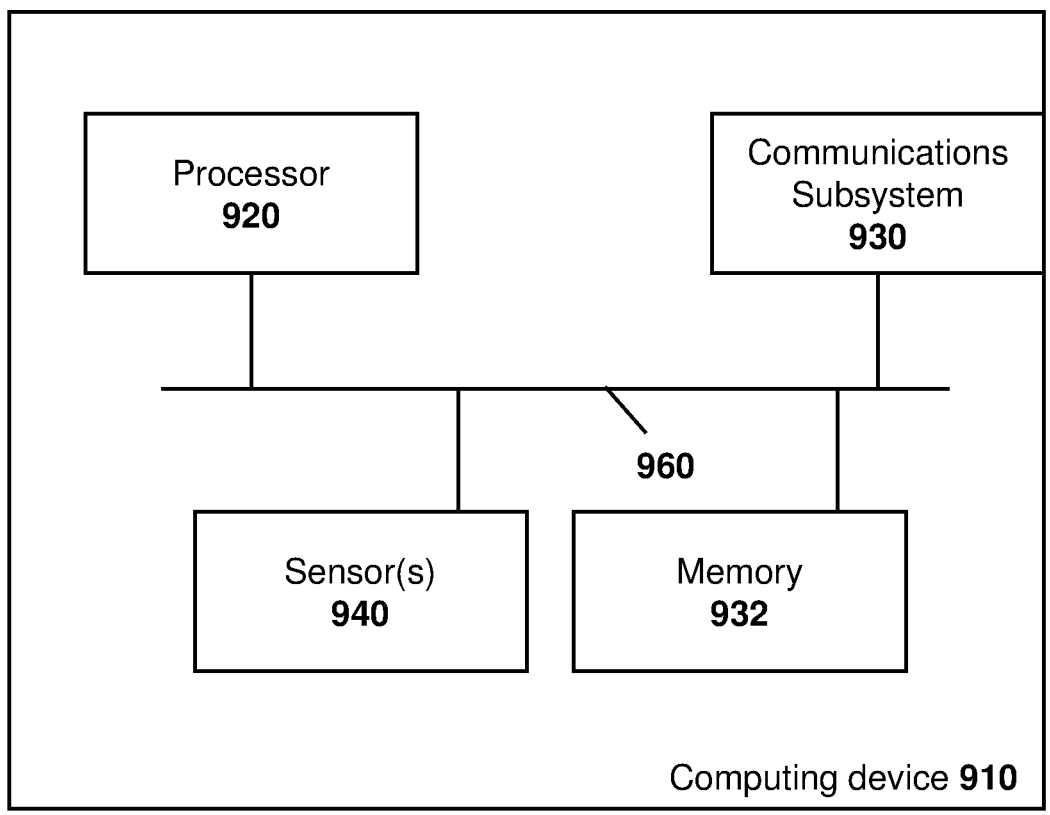
FIG. 9 is a block diagram of a simplified computing device capable of being used with the embodiments of the present disclosure.

In FIG. 9, device 910 includes a processor 920 and a communications subsystem 930, where the processor 920 and communications subsystem 930 cooperate to perform the methods of the embodiments described above. Communications subsystem 930 allows device 910 to communicate with other devices or network elements and may vary based on the type of communication being performed. Further, communications subsystem 930 may comprise a plurality of communications technologies, including any wired or wireless communications technology.

Processor 920 is configured to execute programmable logic, which may be stored, along with data, on device 910, and shown in the example of FIG. 9 as memory 932. Memory 932 can be any tangible, non-transitory computer readable storage medium which stores instruction code that, when executed by processor 920 cause device 910 to perform the methods of the present disclosure. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 932, device 910 may access data or programmable logic from an external storage medium, for example through communications subsystem 930.

In the example of FIG. 9, one or more sensors 940 may be associated with the computing device. However, this is optional and, in some cases, computing device 910 will not be associated with sensors.

Communications between the various elements of device 910 may be through an internal bus 960 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems, or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device comprising:
   maintaining, at the computing device, a plurality of synthetic sensors, each of the plurality of synthetic sensors being configured to generate insights from sensor data received from at least one physical sensor, the at least one physical sensor being separated from the synthetic sensors by a hardware abstraction layer;
   placing a trace on a plurality of behaviors within a kernel on the computing device;
   generating data from the trace;
   providing the data to a translation layer to produce normalized data;
   assembling the normalized data into an event;
   formatting the event into a security sensor output; and
   providing the security sensor output to a security sensor, wherein the security sensor is a synthetic sensor from the plurality of synthetic sensors.

2. The method of claim 1, wherein the trace is an extended Berkley Packet Filter (eBPF) bytecode.

3. The method of claim 1, wherein the data is placed in a ring buffer, and wherein the assembling the data comprises capturing data from a same behavior.

4. The method of claim 1, wherein the formatting the data comprises utilizing a JavaScript Object Notation (JSON) schema to output the data.

5. The method of claim 4, further comprising extending a COVESA Vehicle Signal Specification to include a private security branch.

6. The method of claim 5, wherein the private security branch includes signals with the formatted output as payload.

7. The method of claim 1, wherein the assembling and formatting is performed by a user agent within the kernel space.

8. The method of claim 1, wherein the computing device is an in-vehicle infotainment system on a vehicle.

9. The method of claim 1, wherein the security sensor output is provided to an intrusion detection system on at least one of a second computing device or a virtual machine running on the computing device.

10. The method of claim 1, wherein the trace is implemented on a microkernel.

11. The method of claim 1, wherein the computing device is within a vehicle computing system.

12. A computing device comprising:
a processor; and
a communications subsystem,
wherein the computing device is configured to:
maintain, at the computing device, a plurality of synthetic sensors, each of the plurality of synthetic sensors being configured to generate insights from sensor data received from at least one physical sensor, the at least one physical sensor being separated from the synthetic sensors by a hardware abstraction layer;
place a trace on a plurality of behaviors within a kernel on the computing device;
generate data from the trace;
provide the data to a translation layer to produce normalized data;
assemble the normalized data into an event;
format the event into a security sensor output; and
provide the security sensor output to a security sensor, wherein the security sensor is a synthetic sensor from the plurality of synthetic sensors.

13. The computing device of claim 12, wherein the trace is an extended Berkley Packet Filter (eBPF) bytecode.

14. The computing device of claim 12, wherein the formatting the data comprises utilizing a JavaScript Object Notation (JSON) schema to output the data.

15. The computing device of claim 14, further comprising extending a COVESA Vehicle Signal Specification to include a private security branch.

16. The computing device of claim 15, wherein the private security branch includes signals with the formatted output as payload.

17. The computing device of claim 12, wherein the computing device is an in-vehicle infotainment system on a vehicle.

18. The computing device of claim 12, wherein the security sensor output is provided to an intrusion detection system on at least one of a second computing device or a virtual machine running on the computing device.

19. The computing device of claim 12, wherein the trace is implemented on a microkernel.

20. A non-transitory computer readable medium for storing instruction code, which, when executed by a processor of a computing device cause the computing device to:
maintain, at the computing device, a plurality of synthetic sensors, each of the plurality of synthetic sensors being configured to generate insights from sensor data received from at least one physical sensor, the at least one physical sensor being separated from the synthetic sensors by a hardware abstraction layer;
place a trace on a plurality of behaviors within a kernel on the computing device;
generate data from the trace;
provide the data to a translation layer to produce normalized data;
assemble the normalized data into an event;
format the event into a security sensor output; and
provide the security sensor output to a security sensor, wherein the security sensor is a synthetic sensor from the plurality of synthetic sensors.

* * * * *